United States Patent [19]

Adcock

[11] Patent Number: 5,033,259
[45] Date of Patent: Jul. 23, 1991

[54] BLADE FOR ROTARY LAWNMOWERS AND THE LIKE

[76] Inventor: Paul R. Adcock, Westbourne, 378 Alwoodley Lane, Leeds LS17 7DM, Great Britain

[21] Appl. No.: 382,656
[22] PCT Filed: Jan. 22, 1988
[86] PCT No.: PCT/GB88/00041
  § 371 Date: Aug. 3, 1989
  § 102(e) Date: Aug. 3, 1989
[87] PCT Pub. No.: WO88/05255
  PCT Pub. Date: Jul. 28, 1988

[30] Foreign Application Priority Data

Jan. 23, 1987 [GB] United Kingdom ............... 8701489
Jul. 15, 1987 [GB] United Kingdom ............... 8716639

[51] Int. Cl.$^5$ ............................................. A01D 34/82
[52] U.S. Cl. ......................................... 56/295; 56/255; 56/DIG. 17
[58] Field of Search ................. 56/295, 17.1, 17.5, 56/DIG. 17, 255; 30/276, 347, 351, 353

[56] References Cited

U.S. PATENT DOCUMENTS

| 2,484,511 | 10/1949 | Ingalls | 56/295 |
|---|---|---|---|
| 3,343,350 | 9/1967 | Freedlander et al. | 56/295 |
| 3,343,351 | 9/1967 | Freedlander et al. | 56/295 |
| 3,343,352 | 9/1967 | Freedlander et al. | 56/295 |
| 3,343,355 | 9/1967 | Freedlander et al. | 56/295 |
| 3,369,354 | 2/1968 | Freedlander et al. | 56/295 |
| 3,382,654 | 5/1968 | Freedlander et al. | 56/295 |
| 3,389,541 | 6/1968 | Freedlander et al. | 56/295 |
| 3,392,516 | 7/1968 | Freedlander et al. | 56/295 |
| 3,398,517 | 8/1968 | Freedlander et al. | 56/295 |
| 3,425,199 | 2/1969 | Freedlander et al. | 56/295 |
| 3,425,200 | 2/1969 | Freedlander et al. | 56/295 |
| 3,444,675 | 5/1969 | Freedlander et al. | 56/295 |
| 3,485,022 | 12/1969 | Freedlander et al. | 56/295 |
| 3,614,861 | 10/1971 | Wickham et al. | 56/295 |
| 3,681,903 | 8/1972 | Phillips | 56/295 |
| 3,781,991 | 1/1974 | Stretton et al. | 56/295 |
| 4,250,622 | 2/1981 | Houle | 56/295 |
| 4,262,476 | 4/1981 | Benenati | 56/295 |
| 4,300,336 | 11/1981 | Miyata | 56/295 |
| 4,302,878 | 12/1981 | Bonforte | 56/295 |
| 4,310,999 | 1/1982 | Onoue | 56/295 |
| 4,651,510 | 3/1987 | Malutich | 56/13.4 |
| 4,706,446 | 11/1987 | Doi et al. | 56/17.5 |

FOREIGN PATENT DOCUMENTS

| 838374 | 4/1970 | Canada . | |
|---|---|---|---|
| 1095269 | 2/1981 | Canada | 56/295 |
| 2010882 | 3/1971 | Fed. Rep. of Germany . | |
| 1963836 | 6/1971 | Fed. Rep. of Germany . | |
| 2370419 | 6/1978 | France . | |
| 111742 | 5/1954 | New Zealand . | |
| 129826 | 6/1974 | Norway . | |
| 2023390 | 1/1980 | United Kingdom | 56/295 |
| 2088685 | 6/1982 | United Kingdom . | |

Primary Examiner—Terry Lee Melius
Attorney, Agent, or Firm—Killworth, Gottman Hagan & Schaeff

[57] ABSTRACT

A rotary blade for lawnmower and the like having a plurality of flexible blade members angularly spaced about a central hub portion. The blade is made of plastic, plastic composite, or composite material and is designed to cut grass and the like efficiently but to deflect around obstacles rather than cutting through them and possibly causing injury. Where impact with an obstacle is unavoidable by flexing, points of weakness are provided near the central hub portion of the blade to ensure that the blade members break off during use rather than cutting through an obstacle such as the operator's foot.

32 Claims, 4 Drawing Sheets

BLADE FOR ROTARY LAWNMOWERS AND THE LIKE

BACKGROUND OF THE INVENTION

This invention relates to a blade for rotary lawnmowers and the like.

Rotary lawnmowers, in which a blade revolves at high speed about a vertical axis, have been used for many years. More recently this blade arrangement has been widely used in hovering lawnmowers, in which the mower is supported by a downdraught of air instead of being mounted on wheels. Such mowers are easy to maintain and convenient to use, and have proved very popular. However the growth in their use has been accompanied by numerous accidents in which, for example, the blade has cut into the operator's foot or, if the mower is electrically powered, its power cable, when the mower has been carelessly used.

Accidents such as these have led to several attempts to develop a safer cutting system for rotary lawnmowers, by replacing the standard substantially rigid metal blade with a blade whose edges will not so readily cut through obstacles such as shoes or cables. However these safety blades have until now been unable to match the standard blade for its combination of wear resistance, cutting efficiency, simplicity and ease of manufacture.

Therefore an object of this invention is to provide a safety blade for a rotary lawnmower which can replace, or be supplied instead of, a standard blade without seriously detracting from the mower's performance and ease of use.

SUMMARY OF THE INVENTION

According to this invention, a rotary blade for lawnmowers, brush cutters, trimmers and the like comprises a plurality of flexible and resilient, outwardly extending blade members angularly spaced in fixed relation about a central hub portion.

In preferred embodiments, the inner, root portion of each blade member merges smoothly into the hub portion and into the root portion of adjacent blade members, so as to encourage obstacles to be thrown clear rather than cut. Advantageously, each blade member incorporates one or more points of weakness to ensure that it breaks off rather than applying sufficient force to cut into an obstacle.

In some embodiments, intended primarily for use in grass-collecting machines, each blade member has an upturned vane at its tip to create an updraft as the blade rotates in use. The blade members may incorporate a step to position their cutting edges at a different height to the mower spindle. It is preferred that the blade of this invention is suitable for fitment to any of a variety of different machines, and to this end the hub portion may have a range of attachment points arranged to correspond with the attachment points of common existing machines. The blade is suitably made of a plastic, plastic composite or composite material and each blade member may be provided with two cutting edges, one on either side, to facilitate use of the blade in different machines whose spindles rotate in different senses. There are preferably four blade members, although any number may be used if appropriate. In an embodiment which is particularly suitable for use in machines powered by reciprocating engines, the outer ends of each blade member are weighted to enhance the flywheel properties of the blade.

DETAILED DESCRIPTION OF THE PREFERRED EMBODIMENTS

This invention will now be described by way of example with reference to the accompanying drawings in which FIGS. 1 to 8 are schematic perspective views of various embodiments of the invention.

Figure 1:
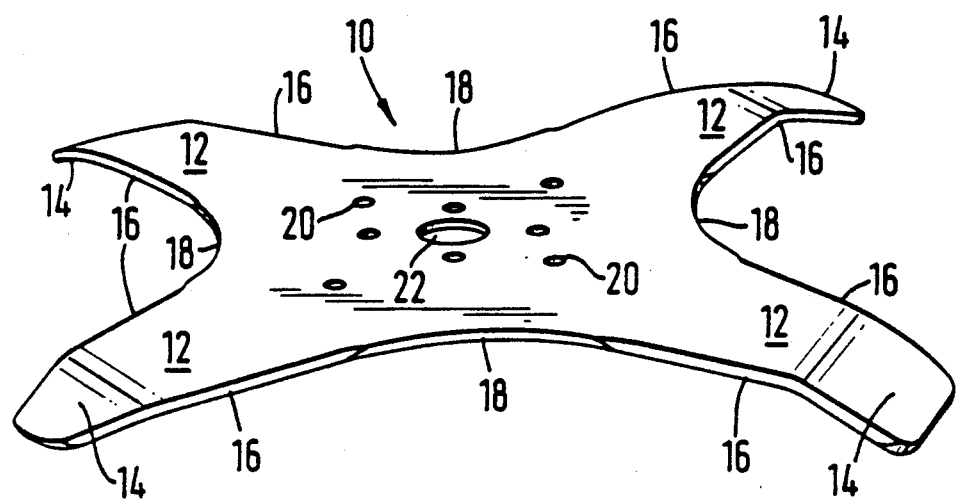
FIG. 1 is a schematic perspective view of a first embodiment of the present invention having wing end turned out of the plane of the blade.

Referring to FIG. 1 of the drawings, a blade 10 comprises four substantially co-planar wings 12 each set at a right angle to each adjacent wing, the blade being of cruciform shape when viewed in plan. Each wing 12 tapers, in plan, converging away from the center of the blade and has an end portion 14 which is turned out of the plane of the blade. Each end portion 14 is turned to the same extent and in the same sense as the others i.e. upwards or downwards when the blade is viewed edge on, and may also be twisted, again in identical fashion to the others, when viewed end-on. A blade edge 16 extends along a substantial portion of both sides of each wing 12 from its tip to near its base, the edge being slightly rounded in profile. The sides of each wing 12 merge smoothly into those of neighbouring wings at their bases along curved edge portions 18.

The blade 10 is made of plastic material selected to be flexible and hard wearing, for example UWMPE, a high molecular weight polycarbonate which may be modified with certain additives to give the required properties.

In use, the blade 10 is mounted to a mower spindle, either as original equipment or as a replacement for a standard blade, by mounting means which engage in mounting holes 20 and/or a center hole 22. A plurality of mounting holes such as holes 20 are disposed in diametrically opposed pairs about the center hole 22, each hole of a pair being equidistant from the center hole, and each pair of holes being set at different distances from the center hole. These distances may be conveniently selected to suit the blade mountings of several typical lawnmowers, as can the hole sizes themselves.

Having two blade edges 16 per wing 12 allows the blade 10 to be used in lawnmowers whose blades rotate in either direction. It also allows the operator to mount the blade 10 with its end portions 14 either upturned or downturned to suit longer or shorter grass respectively. Therefore a single blade moulding can be applied to several different machines in an adaptable fashion, which minimises tooling and manufacturing costs. A blade designed specifically for use in a particular mower, at a given cutting height, may however be provided with only one cutting edge on each wing 12.

Moulding the blade 10 in a plastics material allows it to be made lighter than a metal blade, which among other advantages means that if a piece is broken from the blade, the resulting imbalance is less likely to damage the mower than if the blade was metallic. The weight of the blade 10 may be readily tailored by the addition of, for example, iron filings into the molten plastic before moulding, so as to obtain the desired "flywheel" inertia characteristics.

Standard rotary mower blades typically have two "wings" and are made of steel or other metal, with a sharpened edge on the leading edge of each wing cutting grass as the blade rotates about its center. Providing more than two such cutting edges per revolution reduces the load on the lawnmower's motor, while making these edges slightly rounded in profile reduces the risk of injury without seriously affecting the grass-cutting ability of the blade.

If a standard mower blade strikes an object in use, being of substantially rigid construction it is likely to either cut through it, break, or jam, each of which is potentially damaging to people, property or the mower itself. The blade of the present invention, being of flexible and resilient construction, is much less likely to cause injury or damage. When a wing 12 strikes an object, the curved and twisted ends 14 encourage the wing to twist about its axis so as to allow the blade to deflect around the obstacle, if possible. This deformation and the smooth curvature of the edges 16 and 18, reduces the shear stress at the base of the wing 12 and feeds the loads into the strong central region of the blade 10, which helps the blade to survive without breaking. The curvature of edge 18 is also chosen so as to encourage an obstacle to be "thrown out" from the region of the blade without being significantly cut.

Figure 2:
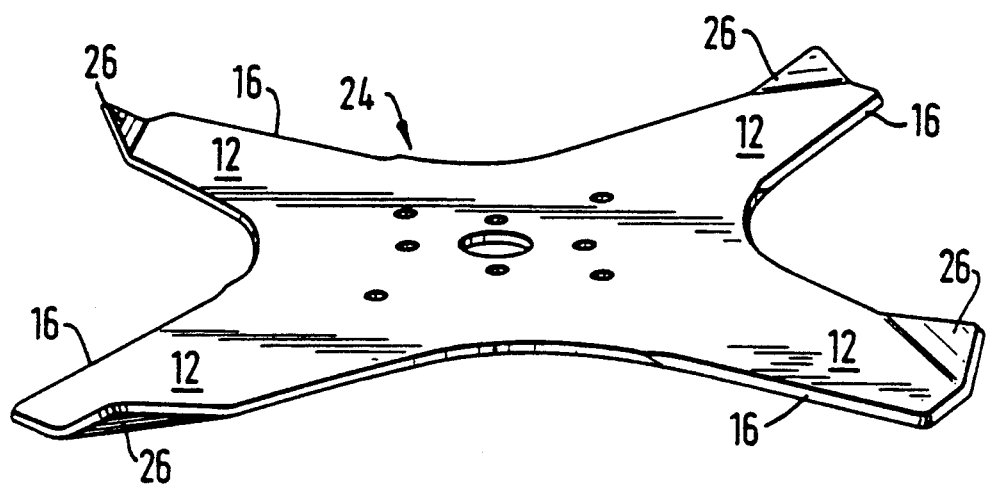
FIG. 2 is a schematic perspective view of a second embodiment of the present invention having vanes on the wing ends.

A further embodiment of the invention, shown in FIG. 2, is intended for use in grass-collecting machines. The blade 24 is substantially the same as blade 10 shown in FIG. 1, but has only one blade edge 16 per wing 12, and has no turned end-portions 14. Instead blade 24 is substantially planar, except for vanes 26, one of which is formed in the trailing portion of each wing-tip on the other edge of the wing 12 from edge 16.

In use blade 24 rotates with blade edges 16 leading and is mounted with vanes 26 inclined upwards. This creates an updraught which carries grass cuttings away from the lawn for collection or disposal. In this embodiment no provision is made for universal fitment to mowers having different directions or rotation, and nor can different cutting heights be achieved by inverting the blade. Different mouldings are required in each case, but nevertheless provision may be made, with a system of holes 20 and 22 as before, to fit a blade 24 to any of a variety of popular machines.

The upthrust of air from vanes 26 causes the tip regions of wings 12 to assume a slight downwards curvature when blade 24 is rotating in use. This curvature assists the blade to deflect around obstacles, in cases where the curved edge 18 does not throw them clear of the cutting edge 16.

Figure 3:
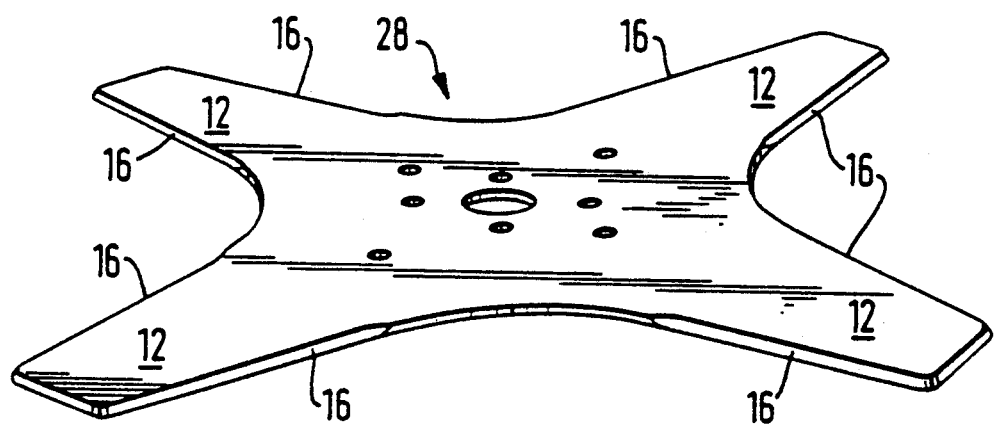
FIG. 3 is a schematic perspective view of another embodiment of the present invention in which the wings are substantially flat and have cutting edges on both edges of each wing.

FIG. 3 shows another embodiment, blade 28, in which the wings 12 are substantially flat and in the same plane as the hub portion. Since the wings 12 have no vanes, blade 28 is suitable for use in mowers whose spindles rotate in either direction and accordingly it may be provided with a blade edge 16 on both edges of each wing 12 as shown. Being essentially planar, blade 28 may be removed and inverted to present fresh cutting edges without significantly changing the height of cut.

Since it is envisaged that the blade of this invention is to be particularly suitable for fitment to existing mowers without requiring the mower to be altered in any way, it may be desired to adapt its shape in order to tailor it to a particular mower and ensure that the mower performs as intended. For instance the height of the blade edges relative to the mower spindle may be adapted in order to ensure the correct height of cut. Examples of blade shapes which achieve this are shown in FIGS. 4 to 7.

Figure 4:
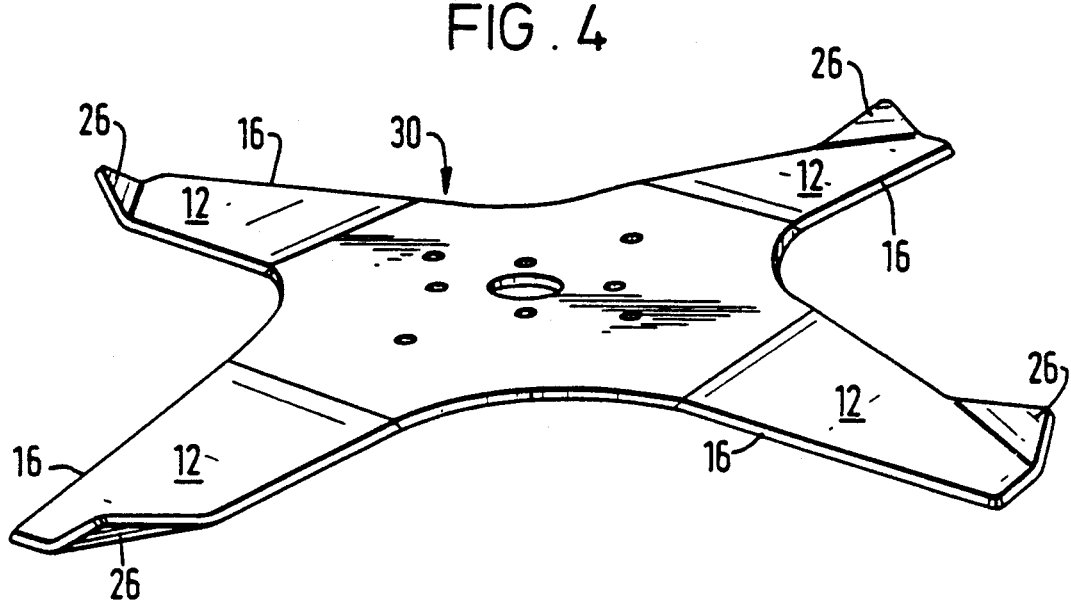
FIG. 4 is a schematic perspective view of the blade of FIG. 2 having wings downturned out of the plane of the hub.
Figure 5:
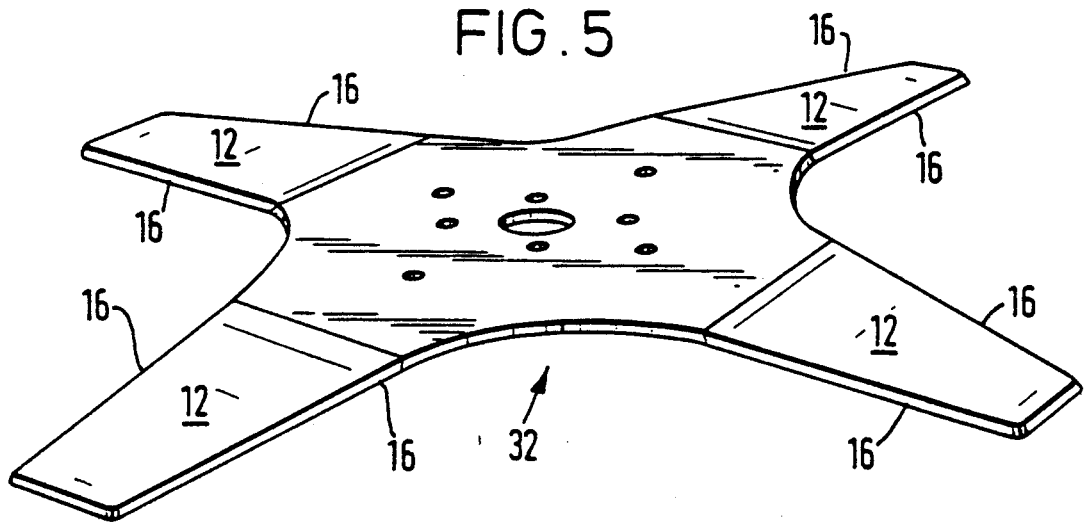
FIG. 5 is a schematic perspective view of the blade of FIG. 3 having wings downturned out of the plane of the hub.

FIGS. 4 and 5 show blades 30 and 32 respectively, blade 30 having upturned vanes 26 suitable for grass collecting mowers and blade 32 having no vanes but having two blade edges 16 per wing 12. Blades 30 and 32 are similar in that their wings 12 are substantially planar but are also slightly downturned out of the plane of the hub.

Figure 6:
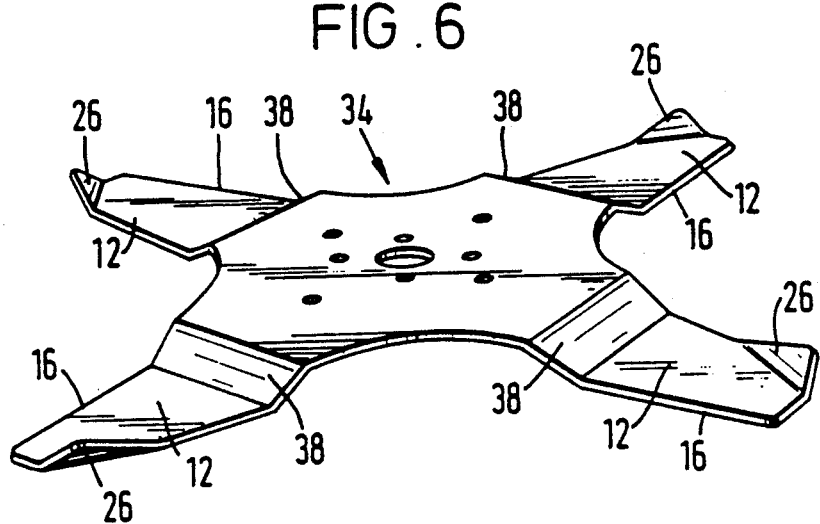
FIG. 6 is a schematic perspective view of a fourth embodiment of the present invention having a step and vane in each wing.
Figure 7:
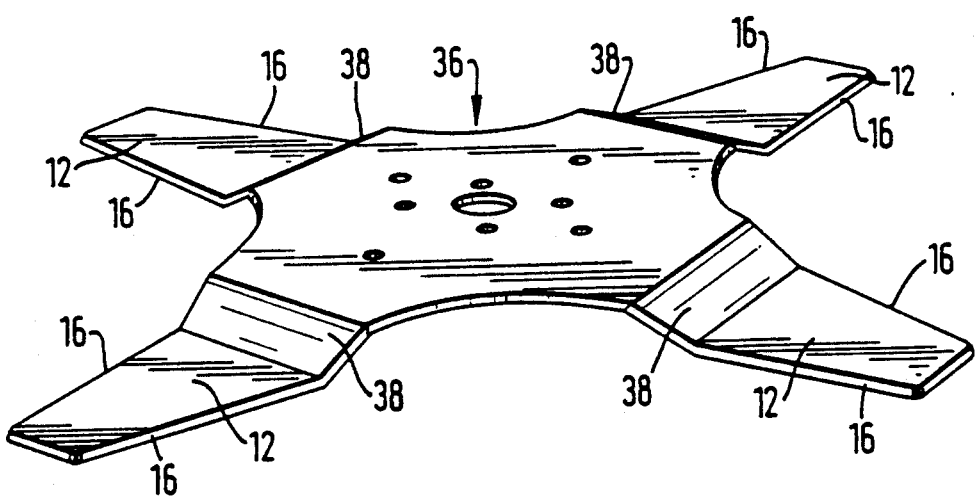
FIG. 7 is a schematic perspective view of a fifth embodiment of the present invention having a step in each wing and cutting edges on both edges of each wing.

Further embodiments are shown in FIGS. 6 and 7, which show blades 34 and 36 respectively having vanes 26 or two blade edges 16 per wing 12 as before. Both blades 34 and 36 have four wings 12 each incorporating a step 38 located towards the wing root, so that the end of each wing is in a different but parallel plane to that of the hub of the blade.

Figure 8:
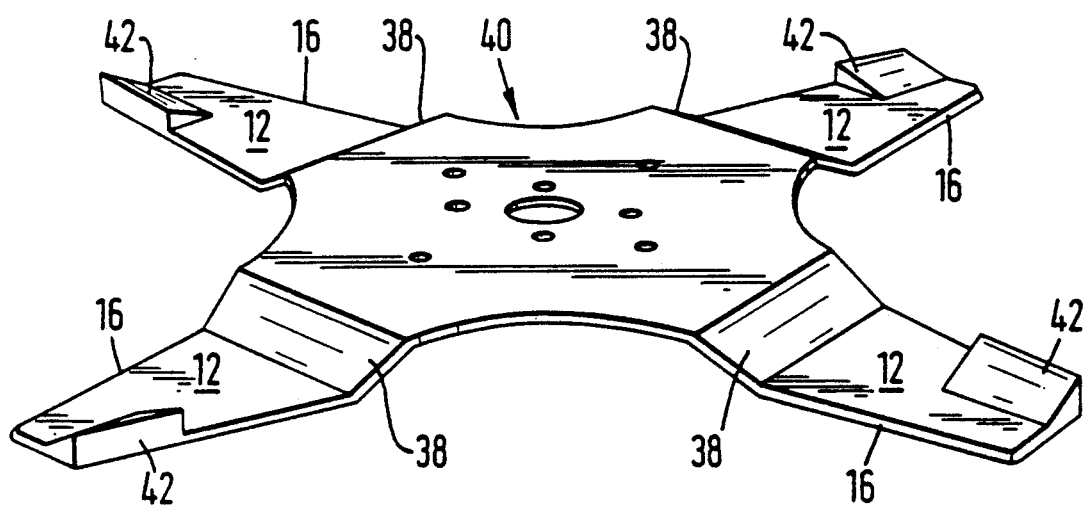
FIG. 8 is a schematic perspective view of a sixth embodiment of the present invention having a step in each wing and a vane of substantially thicker material.

FIG. 8 shows a blade 40 which is similar to the blades of FIGS. 6 and 7 in that the four wings 12 each incorporate a step 38. This embodiment, however, differs from the other embodiments in that each wing 12 has an upturned vane 42 which is formed of a substantially thicker material than the rest of the blade. This provides an increased flywheel effect which is particularly beneficial when the blade 40 is used on a lawnmower powered by a reciprocating engine. Moreover, because the thickness of the vane is no longer similar to that of the rest of the blade 40, the vanes need not be formed by "folding" the ends of the wings but instead can be moulded in any of a variety of shapes such as that shown in FIG. 8.

Other embodiments of this invention may combine features of the various blades described above, for instance incorporating a step in each wing root and also including wings whose ends are turned out of the plane of the blade root.

As an additional safeguard, any of these embodiments may incorporate points of weakness such as notches situated, for instance, on a side edge towards the base of a wing 12. Such a provision ensures that the wing breaks off rather than applying sufficient force to cut into an obstacle, yet survives intact under the lesser loading of safe operation. The broken piece, being made of a material lighter than metal, can do less damage than an equivalent piece in metal if it flies off.

Further variations are possible, for instance three wings may be used or any number in which a shape satisfying performance, safety and cost requirements can be developed. It is envisaged that blades may be made to suit any size of rotary mower, of any model. It is also envisaged that the blade of this invention may be used in other cutting devices such as brush cutters or trimmers, powered by any suitable means and being of any suitable size.

What is claimed is:

1. A cutting device for cutting vegetation such as grass, weeds, brush and bushes, comprising a supportive frame, power means connected to said frame, and a rotary blade rotatably driven by said power means, said rotary blade comprising a plurality of flexible and resilient, outwardly-extending blade members angularly spaced in fixed relation about a central hub portion and each of said blade members further comprising means for breaking off in use, said means for breaking off in use acting as a blade loading safeguard when said blade member is in use and impacts upon an obstacle thereby exceeding said blade loading safegaurd.

2. A cutting device according to claim 1, wherein said means for breaking off in use comprises one or more points of weakness.

3. A cutting device according to claim 2 wherein said one or more points of weakness comprise at least one notch.

4. A cutting device according to claim 1, wherein each of said blade members has first and second cutting edges, one on either side of said blade members adapted to permit said lawnmower to operate said rotary blade with either surface of said hub portion facing upward.

5. A cutting device according to claim 1, shaped so that at least a part of each of said blade members is out of the plane of said hub portion.

6. A cutting device according to claim 1, wherein said blade is substantially comprised of plastic, plastic composite or composite material.

7. A cutting device according to claim 1 wherein said cutting device comprises a lawnmower.

8. A cutting device according to claim 1 wherein said cutting device comprises a brush cutter.

9. A cutting device according to claim 1 wherein said cutting device comprises a trimmer.

10. A cutting device according to claim 1 wherein said means for breaking off in use are disposed substantially adjacent said central hub portion.

11. A cutting device according to claim 10 wherein said means for breaking off in use comprise one or more points of weakness.

12. A cutting device according to claim 11 wherein said one or more points of weakness comprise at least one notch.

13. A cutting device according to claim 10 wherein said means for breaking off in use are disposed along at least one side edge of said blade members.

14. A cutting device according to claim 1 wherein said means for breaking off in use is disposed along at least one side edge of said blade members.

15. A cutting device according to claim 1 wherein said means for breaking off in use are disposed substantially near said central hub portion.

16. A cutting device according to claim 15 wherein said means for breaking off in use are disposed along at least one side edge of said blade members.

17. A cutting device according to claim 15 wherein said means for breaking off in use comprise one or more points of weakness.

18. A cutting device according to claim 17 wherein said one or more points of weakness comprise at least one notch.

19. A rotary blade for cutting devices such as lawnmowers, brush cutters, trimmers and the like, said rotary blade comprising a plurality of flexible and resilient, outwardly-extending blade members angularly spaced in fixed relation about a central hub portion and each of said blade members further comprising means for breaking off in use, said means for breaking off in use acting as a blade loading safeguard when said blade member is in use and impacts upon an obstacle thereby exceeding said blade loading safeguard.

20. A blade according to claim 19, wherein said blade is substantially comprised of plastic, plastic composite or composite material.

21. A blade according to claim 19, wherein each of said blade members is weighted with metallic filings disposed in the blade member material.

22. A blade according to claim 19 wherein said means for breaking off in use are disposed along at least one side edge of said blade members.

23. A blade according to claim 19 wherein said means for breaking off in use comprises one or more points of weakness.

24. A blade according to claim 23 wherein said one or more points of weakness comprise at least one notch.

25. A blade according to claim 19 wherein said means for breaking off in use is substantially near said central hub portion.

26. A blade according to claim 25 wherein said means for breaking off in use is disposed along at least one side edge of said blade members.

27. A blade according to claim 25 wherein said means for breaking off in use comprises one or more points of weakness.

28. A blade according to claim 27 wherein said one or more points of weakness comprise at least one notch.

29. A blade according to claim 19 wherein said means for breaking off in use is substantially adjacent said central hub portion.

30. A blade according to claim 29 wherein said means for breaking off in use is disposed along at least one side edge of said blade member.

31. A blade according to claim 29 wherein said means for breaking off in use comprises one or more points of weakness.

32. A blade according to claim 31 wherein said one or more points of weakness comprise at least one notch.

* * * * *